(12) United States Patent
Gain et al.

(10) Patent No.: US 11,229,202 B2
(45) Date of Patent: Jan. 25, 2022

(54) MEDICAL DEVICE IN THE FORM OF A CARTRIDGE FOR PRESERVATION OF A CORNEAL SPECIMEN

(71) Applicants: UNIVERSITE JEAN MONNET, Saint Etienne (FR); CENTRE HOSPITALIER UNIVERSITAIRE, Saint Etienne (FR)

(72) Inventors: Philippe Gain, Lyons (FR); Gilles Thuret, Saint Bonnet les Oules (FR); Pascal Herbepin, Venissieux (FR)

(73) Assignees: UNIVERSITE JEAN MONNET, Saint Etienne (FR); CENTRE HOSPITALIER UNIVERSITAIRE, Saint Etienne (FR)

(*) Notice: Subject to any disclaimer, the term of this patent is extended or adjusted under 35 U.S.C. 154(b) by 56 days.

(21) Appl. No.: 16/772,660

(22) PCT Filed: Dec. 14, 2018

(86) PCT No.: PCT/EP2018/084918
§ 371 (c)(1),
(2) Date: Jun. 12, 2020

(87) PCT Pub. No.: WO2019/115754
PCT Pub. Date: Jun. 20, 2019

(65) Prior Publication Data
US 2021/0076667 A1    Mar. 18, 2021

(30) Foreign Application Priority Data
Dec. 15, 2017 (FR) .................................. 1762209

(51) Int. Cl.
*A01N 1/02* (2006.01)

(52) U.S. Cl.
CPC ......... *A01N 1/0242* (2013.01); *A01N 1/0263* (2013.01); *A01N 1/0273* (2013.01)

(58) Field of Classification Search
CPC ... A01N 1/0273; A01N 1/0263; A01N 1/0242
See application file for complete search history.

(56) References Cited

U.S. PATENT DOCUMENTS

| 5,789,240 A | 8/1998 | Abdulrazik |
| 10,188,097 B2 * | 1/2019 | Gain .................... A01N 1/0247 |

(Continued)

FOREIGN PATENT DOCUMENTS

| CN | 204860784 U | 12/2015 |
| DE | 102014222547 B3 | 2/2016 |

(Continued)

OTHER PUBLICATIONS

Bernard et al., "Femtosecond Laser Cutting of Multiple Thin Corneal Stromal Lamellae for Endothelial Bioengineering", Cornea, vol. 34, No. 2, Feb. 2015, pp. 218-224.

*Primary Examiner* — Jonathan M Hurst
(74) *Attorney, Agent, or Firm* — BCF LLP

(57) ABSTRACT

The invention relates to a medical device in the form of a cartridge (2) incorporating an assembly permitting the preservation of corneal tissue that has been obtained beforehand by sampling, the device comprising: a storage compartment (24) containing a preserving fluid, at least one input terminal (21) upstream from the storage compartment (24), for injecting a compressed pressurizing gas, at least one control terminal (22) upstream from the storage compartment (24), for injecting a compressed control gas, a pneumatically controlled switching system (26) downstream from the terminals (21, 22), said switching system (26) being controlled by the compressed control gas in order to permit or (Continued)

prohibit the circulation of the compressed pressurizing gas towards the storage compartment (24).

10 Claims, 4 Drawing Sheets

(56) References Cited

U.S. PATENT DOCUMENTS

| | | | |
|---|---|---|---|
| 2008/0294149 A1 | 11/2008 | Krolman | |
| 2011/0014690 A1 | 1/2011 | Skelnik et al. | |
| 2016/0338345 A1* | 11/2016 | Foglia | A01N 1/0273 |
| 2018/0206482 A1* | 7/2018 | Zhang | A01N 1/0273 |

FOREIGN PATENT DOCUMENTS

| | | |
|---|---|---|
| FR | 2965254 A1 | 3/2012 |
| WO | 2006/052478 A1 | 5/2006 |
| WO | 2010/116338 A1 | 10/2010 |
| WO | 2014/140434 A1 | 9/2014 |

* cited by examiner

MEDICAL DEVICE IN THE FORM OF A CARTRIDGE FOR PRESERVATION OF A CORNEAL SPECIMEN

CROSS-REFERENCE TO RELATED APPLICATIONS

This application is a national phase filing under 35 U.S.C. § 371 of International Application No. PCT/EP2018/084918 filed on Dec. 14, 2018, which claims benefit of priority from French Patent Application No. 1762209 filed Dec. 15, 2017, the contents of which are hereby incorporated by reference in their entirety.

FIELD OF THE INVENTION

The present invention relates to the general technical field of medical devices for preservation and/or quality control (imaging, microbiological analysis, etc.) and/or treatment of human or animal corneal tissue previously removed from a donor. This corneal tissue is composed of the cornea itself and its peripheral scleral ciliary zone surrounding it.

Such preserved corneal tissue can be used to perform corneal transplantation, or for ex vivo experimentation.

More precisely, the present invention relates to the technical field of devices for preserving corneal tissue comprising:
means for receiving and locking corneal tissue,
means for circulating one (or more) fluid(s) (liquid or gaseous) for preserving corneal tissue.

BACKGROUND OF THE INVENTION

Various devices for preserving corneal tissue have already been proposed.

Document U.S. Pat. No. 5,789,240 describes a device for preserving corneal tissue simulating the anterior chamber of the eye. This device does not permit sterile circulation of a preserving fluid on both sides of the corneal tissue, i.e., on both the epithelial and endothelial sides of the corneal tissue. In addition, because the walls of the device are not transparent, it is not possible to perform corneal tissue imaging or a laser cutting procedure without opening the device. As a result, the survival time of the corneal tissue is short and incompatible with use for corneal transplantation.

Document WO 2014/140434 describes a corneal tissue preservation device to address these drawbacks.

The device according to WO 2014/140434 includes:
means for receiving a corneal specimen including a first part—called the "intermediate component"—comprising a hole of the diameter of the cornea surrounded by a circular groove and an edge forming a housing intended to receive the corneal specimen, the housing ensuring the correct centering of the corneal specimen when it is placed in the device and allowing the corneal specimen to remain stable when the device is opened in the operating theatre;
means of confinement comprising a second part—called the "endothelial lid"—comprising a hole the diameter of the cornea surrounded by an edge intended to entrap the corneal specimen by crushing a scleral ciliary zone of the corneal specimen onto the circular groove of the intermediate component,
the means for receiving and entrapping the corneal specimen sealingly locking the scleral ciliary zone surrounding the cornea to delimit a separate endothelial chamber and epithelial chamber in which a preservation medium can circulate with an overpressure in the endothelial chamber.

The preservation device described in WO 2014/140434 has many advantages and allows long-term preservation of corneal tissue.

The present invention aims to improve the device described in WO 2014/140434 in order to facilitate its mobility, ergonomics and reliability while optimizing the associated manufacturing costs.

In particular, a purpose of the present invention is to provide a medical device in which:
the corneal tissue can be stored for a longer period,
the quality of the corneal tissue is improved.

BRIEF DESCRIPTION OF THE INVENTION

For this purpose, the invention relates to a medical device in the form of a cartridge incorporating an assembly allowing the preservation of previously removed corneal tissue, the device comprising:
an at least partially transparent base,
at least one side wall,
means for receiving and locking corneal tissue, and
a lid to cover an opening in the side wall opposite the base,
a storage compartment containing a preserving fluid,
at least one inlet terminal upstream of the storage compartment, said inlet terminal being intended to be connected to a device for injecting compressed pressurizing gas, the pressurizing gas allowing:
to propel the preserving fluid contained in the storage compartment (24) to the preservation chambers,
to maintain the preserving fluid at a predefined pressure, the device being configured such that, in use, the base, the side wall, and the lid define, together with the corneal tissue, endothelial and epithelial preservation chambers, notable in that the device further comprises, upstream of the preservation chambers:
at least one control terminal upstream of the storage compartment, said control terminal being intended to be connected to a control compressed gas injection device,
a pneumatically piloted switching system downstream of the terminals, said switching system being piloted by the control compressed gas to allow or prohibit the flow of pressurizing gas to the storage compartment The removable cartridge incorporating the various elements for corneal tissue preservation (storage compartment for preserving fluid, terminals, controller, etc.) makes it easier to handle and improves its mobility. The fact that the switching system is controlled by a control gas also reduces the production costs of the cartridge.

Preferred but non-limiting aspects of the medical device according to the invention are the following:
the device may also include a filter upstream of the storage compartment to filter the compressed pressurizing gas injected at the inlet terminal;
the preserving fluid can be contained directly in the storage compartment, with the filtered compressed pressurizing gas injected at the inlet terminal being introduced directly into the storage compartment and mixing with the preserving fluid;
the device may further comprise an inflatable ball housed in the storage compartment, the preserving fluid being contained in a flexible container housed in the same storage compartment, the injection of pressurizing compressed gas inducing an expansion of the inflatable ball so that the walls of said ball presses against the walls of the flexible container and causes the ejection of the preserving fluid towards the preservation chambers;

the device advantageously comprises channels for the circulation of preserving fluid and channels for the circulation of compressed gas, said channels being etched in the mass;

the device also comprises a recovery reservoir downstream of the preservation chambers, the switching system being arranged upstream of the recovery reservoir and allowing the flow of the preserving fluid inside the preservation chambers to be controlled;

the switching system comprises at least one valve piloted by pneumatic pressure by means of the control compressed gas injected into the at least one control terminal, each valve being closed in the absence of control compressed gas applied to the at least one control terminal;

the device may also include an inflation balloon, as manual actuation of the inflation balloon increases the pressure in the storage compartment and therefore in the preservation chambers;

the input and control terminals are arranged on the device so as to be automatically connected to linking means connected to the injection device when said device is inserted into a docking station;

the device further comprises guide means at its periphery enabling said device to be plugged into a rack of a support structure of the docking station.

BRIEF DESCRIPTION OF THE DRAWINGS

Other advantages and features of the device according to the invention will become clearer from the description that will follow of several alternative embodiments, given by way of non-limiting examples, from the appended drawings wherein.

DETAILED DESCRIPTION OF THE INVENTION

Various examples of the device will now be described with reference to the figures. In these different figures the equivalent elements are designated by the same numerical reference.

1. General Information about the Device
1.1. General Structure of the System

Figure 1:
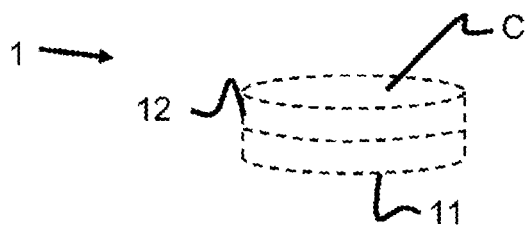
FIG. 1 is a schematic representation of the endothelial and epithelial chambers of the device.
Figure 2:
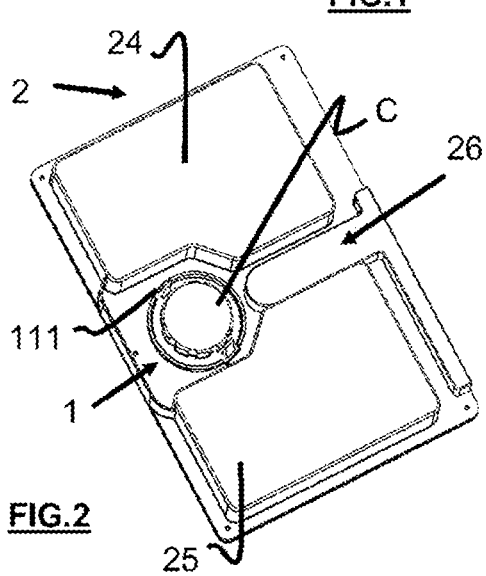
FIGS. 2, 3 and 4 are schematic representations of an integrated medical device in the form of a plug-in cartridge.
Figure 3:
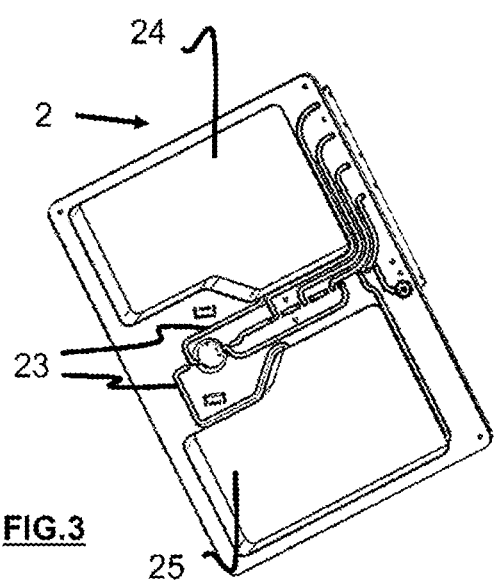
Figure 4:
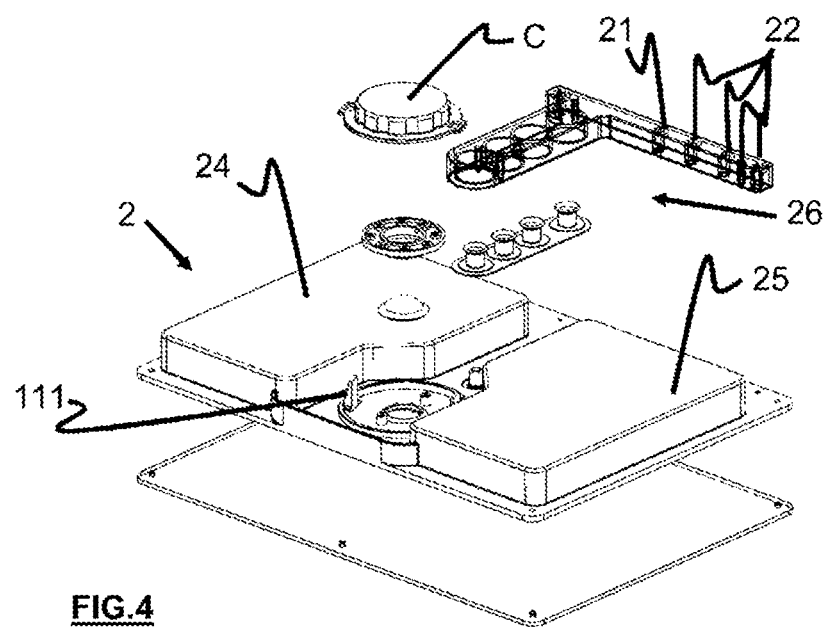

With reference to FIG. 1, the preservation chambers 1 of the device, in particular the endothelial and epithelial chambers, have been illustrated, these preservation chambers 1 being delimited by:

previously removed corneal tissue on the one hand, and a base 11 (partially shown in FIG. 1), at least one side wall 12 and a lid C of the device on the other hand.

The base 11 is preferably made of a material transparent to light radiation, either in its entirety or in an area opposite the lid C.

The lid C can consist of:

a "standard" lid (including a covering wall to cover an upper opening in the side wall 12 opposite the base, and peripheral fastening means) made of a transparent material, or an applanation lid, for example for cutting corneal tissue with the laser or imaging it, or a trepanation lid for mechanical trepanation of corneal tissue, or any other type of lid depending on the intended application.

The transparency of the base 11 and the lid C offers the possibility of a transversal visual access (through-going visual access for inspection).

In the embodiment illustrated in FIG. 1, the preservation chambers have a cylindrical shape. However, the preservation chambers may have other shapes (for example parallelepiped, ovoid, etc.) depending on the intended application.

The base 11, the side wall 12 and the lid C can be made in two or more pieces.

For example, in a first embodiment, the base 11 and the side wall 12 are made in one piece. In this case the base 11 is transparent to allow visual inspection of the corneal specimen), the transparent lid C consisting of a separate part to close the upper opening.

In a second embodiment, the lid C and the side wall 12 are made in one piece.

Finally, in a third embodiment, the base 11, the side wall 12 and the lid C can consist of three independent parts for assembly. In these different alternatives, the base 11 includes clipping means 111 intended to cooperate with a peripheral flange 122 extending radially outwards from the side wall 12.

The clipping means 111 may comprise two (or more) spring-back elastic (for example shape memory) tabs arranged opposite each other and extending substantially perpendicular to the base 11. When the base 11 comprises more than two elastic tabs, these may be evenly distributed at different positions of the base 11 so as to surround the side wall 12. The fact that the elastic tabs are evenly distributed makes it possible to apply a substantially homogeneous force over the entire periphery of the side wall 12.

Each elastic tab is provided with a hooking lip at its free end. Each hooking lip projects in a horizontal plane (parallel to the base 11). Of course, the clipping elements 111 could be of any other type known to the skilled person.

Advantageously, each elastic tab can include a zone of weakness allowing the elastic tab to break when a force (above a threshold value) is applied in a direction opposite to the hooking lip. This makes it easier to release the side wall 12 in order to free the corneal tissue during a corneal graft surgery procedure, for example.

It is quite obvious to the skilled person that in certain embodiments, the elastic tabs can be devoid of areas of weakness. Thus, in these embodiments, the elastic tabs can be moved apart (without breaking) to allow the removal and replacement of lid C at the time of sampling, for example when the centering of the cornea has not been carried out correctly.

1.2. Device Integration

The device is a cartridge containing the preservation chambers for receiving corneal tissue, and a fluidic assembly for circulating a preserving fluid from a storage compartment to a recovery reservoir. All the elements are interdependent and inseparable and are shaped in the mass.

For example, the cartridge can be shaped like a parallelepiped including:

- one (or more) input connection terminal(s) 21 opening to the outside of the cartridge 2, and intended to be connected to linking means of a docking station 6 (which will be described hereinbelow with reference to FIG. 5), said linking means being connected to one (or more) source(s) of pressurizing gas,
- one (or more) control connection terminal(s) 22 leading to the outside of the cartridge 2, and intended to be connected to the connecting means of the docking station 6,
- a storage compartment 24 forming a housing for a preserving fluid (which can be contained in a medical pouch type container),
- a recovery reservoir 25 intended to collect user fluids from the preservation chambers 1,
- a switching system 26 including one (or more) deformable valve(s) for controlling the flow rate of the preserving fluid inside the preservation chambers, the pressurization of the preservation chambers and the circulation of the preserving fluid etc.
- circulation channels (for preserving fluid or gas) 23 extending inside the cartridge 2 between:
  - the input connection terminal(s) 21 and the storage compartment 24,
  - the storage compartment 24 and the preservation chambers 1,
  - the control connection terminal(s) 22 and the switching system 26, and between
  - the preservation chambers 1 and the recovery reservoir 25
- these channels 23 are advantageously etched in the body of the cartridge itself in order to avoid the problems associated with conventional wiring (such as connections, joints, lengths of tubing, porosity of tubing, particularly with gases, etc.).

Advantageously, each cartridge can include a radio-frequency identification (RFID) tag to ensure the traceability of the corneal sample during its storage.

In addition, each cartridge may include an inflation balloon, with manual actuation of the inflation balloon increasing the pressure to initiate the first pressurization of the preservation chambers 1 when the cartridge 2 is disconnected from the docking station 6.

1.3. Docking Station

The fact that the device integrates the preservation chambers 1 and its peripherals in the form of a cartridge 2 facilitates handling and storage, for example in a docking station that allows the preservation chambers to be maintained at a desired temperature, at a controllable pressure and in a controlled atmosphere (percentages of $N_2$, $O_2$, $CO_2$ in particular). This integration also improves the sterility of the interior of the medical device, in particular by separating the circuits of gas and preserving fluid(s) and connecting them by terminals (without tubing).

Figure 5:
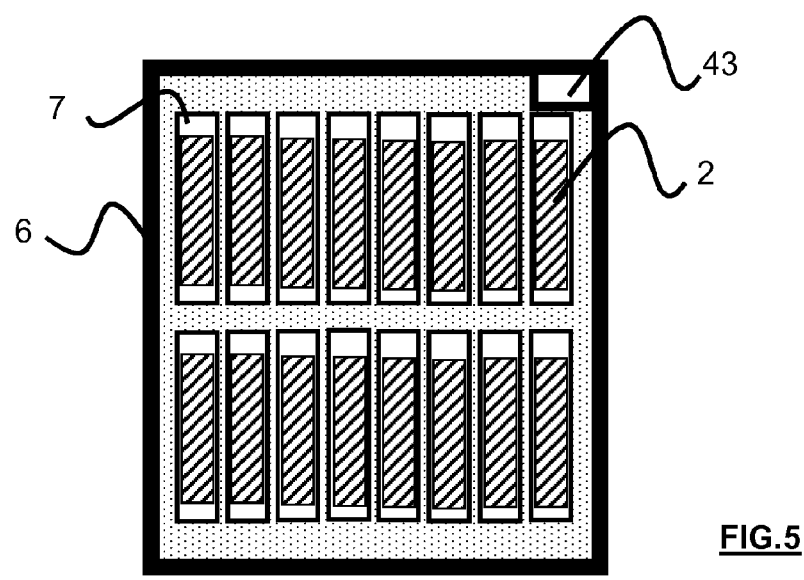
FIG. 5 is a schematic representation of a docking station adapted to receive a plurality of cartridges as shown in FIGS. 2 to 4, FIGS. 6 and 7 are functional representations of two alternative embodiments of the integrated medical device in cartridge form.

As a guide, an example docking station is shown in FIG. 5. The docking station 6 contains temperature control means to maintain its interior volume at a set temperature.

This docking station 6 is, for example, a commercially available preservation oven. The inner volume of the docking station 6 consists of a support structure with racks 7 each for receiving one cartridge 2.

Each rack 7 has linking means intended to be connected to the input and control terminals 21, 22 of its associated cartridge 2 to allow the gas supply of the latter. Insertion of the cartridge into the rack 7 allows the connection means to be connected to the input terminals. Each rack 7 may also include means for checking the presence of the cartridge and/or means for reading/writing the RFID tag.

The docking station 6 also contains an injection device 43 such as a diaphragm pump or other system for producing compressed air or gas to supply each cartridge 2.

The docking station includes a pressure regulation control means, as well as a pneumatic switching sequential control means of the switching system 26. These monitoring and control means are common to all the cartridges 2 and are sequentially assigned to each of the cartridges 2 via the connecting means contained in each of the racks into which the cartridges are inserted. This is in order to advantageously mutualize the pressure regulation and the flow of preserving fluid within each of the cartridges 2 present in the docking station 6.

The docking station 6 can be connected (via a wired or wireless link) to a remote control unit such as a personal computer, or a touch tablet, or any other control unit known to the skilled person. When inserted into the docking station 6, the cartridge 2 is in long-term storage mode, with regulated pressure and flow. When the cartridge 2 is removed from the docking station 6, the fluid flow is stopped, and the integrated switching system 26 advantageously allows the preserving fluid to be pressurized in its internal circuits independently. This, together with the consequent reduction in weight and volume, makes the cartridge extremely mobile, allowing it to be moved from one point to another.

Different elements of the device according to the invention will now be described in more detail.

2. Preservation Chambers

2.1. Corneal Tissue Locking Means

The device comprises means 14 for locking the corneal tissue 3 in position so that the epithelial side of the corneal tissue 3 extends opposite the lid 13.

Figure 9:
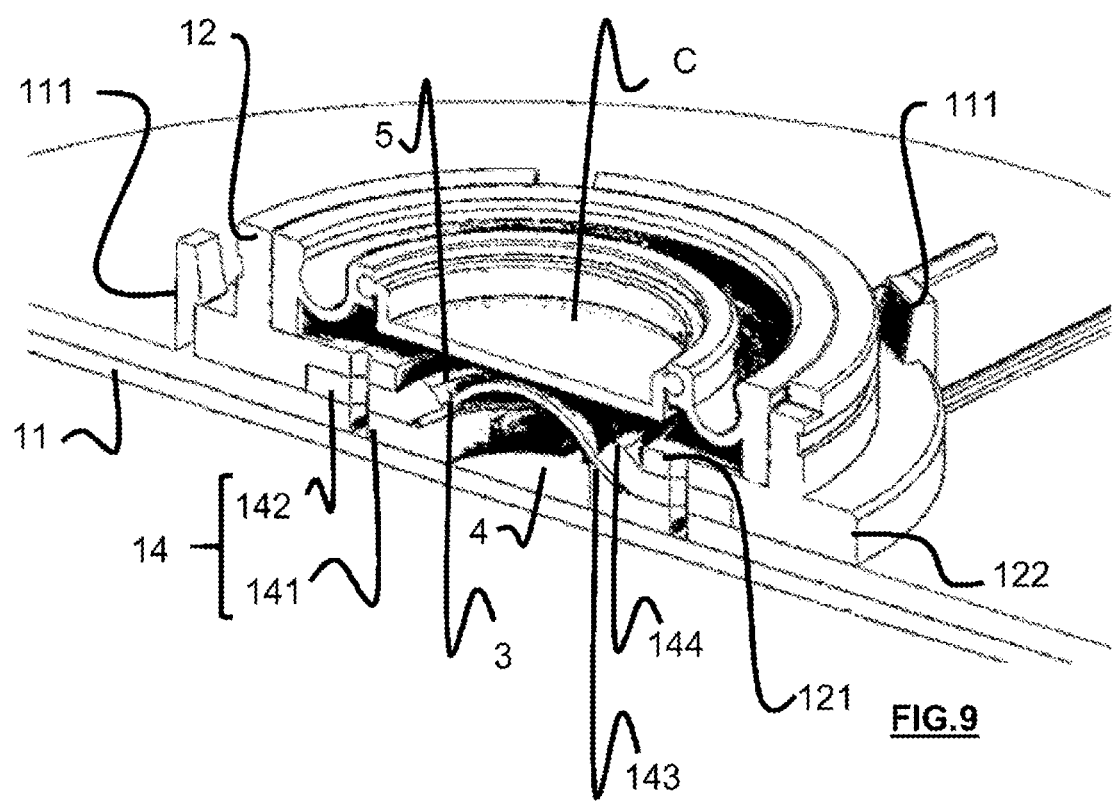
FIG. 9 is a schematic representation showing the endothelial and epithelial chambers in more detail.

In reference to FIG. 9, the locking means define, together with the corneal tissue 3, the preservation chambers known respectively as the "endothelial chamber" 4 and the "epithelial chamber" 5.

Specifically, the locking means include:
- a base 141 on which the base 11 is fixed, and intended to receive the corneal tissue 3,
- a flexible retaining ring 142 to hold the corneal tissue 3 in position on the base 141.

The endothelial chamber 4 and the epithelial chamber 5 may each have at least three ports:
- an inlet port for the injection of preserving fluid,
- an outlet for the discharge of the preserving fluid, and
- a technical port for taking a fluid sample (for example for analysis) or injecting additional substances into the chamber.

The inlet and outlet ports of the two chambers 4, 5 allow a preserving fluid to be circulated and renewed to optimize the preservation of corneal tissue.

Advantageously, the composition of the preserving fluid injected into the epithelial chamber 5 may be different from the composition of the preserving fluid injected into the endothelial chamber 4.

2.1.1. Base

The base 141 is the cartridge base. It has a central opening whose upper edge 143 (opposite base 11) is intended to receive corneal tissue. The diameter of the central opening is preferably approximately equal to the diameter of a cornea (typically between 9 and 13 millimeters in diameter).

The surface of the upper edge 143 of the base 141 (i.e. opposite the base 11) may be curved to conform to the curvature of the corneal tissue 3. In particular, the surface of the upper edge 143 may have a truncated cone shape, or even a toric shape.

The corneal tissue 3 is intended to be placed on the base 141 so that the peripheral scleral ciliary zone of the corneal tissue 3 comes into contact with the upper edge 143.

The base 141 also includes (at least) one inlet port and (at least) one outlet port. The inlet and outlet ports allow the preserving fluid 41 to flow into the endothelial chamber 4, the walls of which are defined by:

the base 11 of the device,
the base 141,
the retaining ring 142, and
the corneal tissue 3.

2.1.2. Retaining Ring

The retaining ring 142 extends perpendicularly inwards from the side wall 12.

The hole in the retaining ring 142 can be elliptical or circular. In the case of a circular hole, the inner diameter of retaining ring 142 is preferably approximately equal to the diameter of a cornea (typically between 9 and 13 millimeters in diameter) and approximately identical to the central opening of the base 141. Thus, the sclera of the corneal tissue 3 is intended to come into contact with the inner edge 144 of the retaining ring 142.

The retaining ring is advantageously made of a flexible material so that it can be bent by elastic deformation to conform to the profile of the upper edge 143, the edge profile 143 of which is complementary to the curvature of the corneal tissue. This also allows the retaining ring 142 to absorb any irregularities in the scleral ciliary zone by squeezing to a greater or lesser extent to ensure calibrated force support and sealing in the contact area between the corneal specimen 3 and the retaining ring 142.

The retaining ring 142 can be attached to the side wall 12 or can be detachably mounted on side wall 12. For example, in the embodiment illustrated in FIGS. 9 and 10, the inner side of the side wall 12 has an inwardly extending annular border 121. This annular border 121 is intended to press the retaining ring 142 against the base 141 when side wall 12 is assembled on the base 11.

Of course, the annular border 121 can be replaced by a plurality of studs arranged on the inside of the side wall 12 and extending radially inwards therefrom.

2.1.3. Principle of Operation

The principle of operation of the locking means 14 is as follows.

The corneal tissue 3 is placed on the base 141 so that the endothelial side of the corneal tissue 3 lies opposite the base 11. The peripheral scleral ciliary zone of the corneal tissue 3 comes into contact with the upper edge 143 of the base 141.

The retaining ring 142 is placed on the corneal tissue 3 The inner edge 144 comes into contact with the peripheral scleral ciliary zone of the corneal tissue 3.

The side wall 12 of the device is assembled on the base 11. Specifically, the side wall 12 is moved translationally between the clipping means 111. The shape-reversing spring tabs move out of their original position when the peripheral flange 122 passes over the hooking lips.

Approaching the base 11, the annular border 121 of the side wall 12 tends to press the retaining ring 142 against the base 141. The translational movement of the side wall 12 induces a translational movement of the retaining ring 142 towards the base 141 so as to lock the corneal tissue 3 in position.

The fact that the movement of the retaining ring is rectilinear (i.e. translation of the retaining ring 142 towards the base 141) rather than helical (for example when the retaining ring is screwed in) limits the risk of twisting the corneal tissue 3 when it is locked in position. This improves the viability of the corneal tissue thus preserved. Indeed, a twisting of the corneal tissue induces the appearance of folds in the corneal tissue, these folds causing an accelerated degradation of the cells and corneal tissue 3.

When the edge reaches a position in which the peripheral flange 122 extends under the hooking lips, the elastic tabs return to their respective initial positions so that the hooking lips press the side wall against the base 11 by applying a pressing force to the peripheral flange 122.

The scleral ciliary zone is compressed between the upper edge 143 of the base 141 and the inner edge 144 of the retaining ring 142 to hold the corneal tissue 3 in position. The use of clipping means for assembling the side wall 12 against the base 11 ensures that a constant compression force of the scleral ciliary zone is applied from one medical device to another.

This makes the operation of inserting corneal tissue into the device repeatable and easily performed by an operator inexperienced in the use of the device.

The reader will have understood that the above operating principle has been presented with reference to a medical device in which the retaining ring 142 is not attached to the side wall 12. It is quite obvious to the skilled person that the steps of placing the retaining ring 142 and the side wall 12 are carried out simultaneously in the case of a medical device in which the retaining ring 142 is attached to the side wall 12.

2.2. Preservative Fluid Supply

Once the corneal tissue has been installed and the preserving fluid circulation has been started, the corneal tissue can be preserved for several weeks prior to its use for corneal transplantation or ex vivo experimentation.

To increase the storage life of the corneal specimen, a preserving fluid is used.

The management of the supply of preserving fluid to the device is ensured by the following set of elements:

At the cartridge 2:
- the inlet connection terminal(s) 21 and control terminal(s) 22 intended for connection to one (or more) source(s) of pressurizing gas,
- the storage compartment 24 forming a housing for a preserving fluid: the preserving fluid can be contained directly in the compartment 24 or be contained in a container (for example of the medical pouch type) arranged in the compartment 24,
- the recovery reservoir 25 intended to collect the user fluids from the preservation chambers 1,
- the switching system 26 for controlling the circulation of the preserving fluid,
- The circulation channels 23 extending into the cartridge 2, At the docking station 6:
- the linking means for connection to the input and control terminals, an injection device 43 using compressed gas to distribute the fluid 41 and control the switching system 26.

This set of elements allows the circulation and renewal of the preserving fluid in the endothelial chamber 4 and/or in the epithelial chamber 5. This set of elements also allows the pressure inside the endothelial and epithelial chambers 4, 5 to be varied so as to have a continuous overpressure in the endothelial chamber 4. This overpressure may correspond to the pressure physiologically encountered by the cornea on the endothelial side, or it may correspond to any other pressure chosen by the user.

Advantageously, if the compartment 24 of the cartridge 2 comprises two distinct preserving fluids (for example contained in separate compartments of compartment 24 or in medical pouch-type containers housed in the compartment 24) each associated with a respective chamber, then the composition of the preserving fluid circulating in the endothelial chamber 4 may be different from the composition of the preserving fluid circulating in the epithelial chamber 5 (for example a mixture of preserving fluid+gas of controlled composition $N_2$ $O_2$ $CO_2$). This makes it possible to have a preservation medium adapted to each cell type (endothelial and epithelial).

The injection device 43 allows the injection of pressurized gas into the storage compartment 24 and the switching system 26. The injection device 43 can be contained in the docking station 6 and connected to the cartridge 2 via the connection terminals 21, 22 of the cartridge 2. The injection device 43 is, for example, a gas compressor, or compressed gas cartridge, or a connection to a compressed air network, making it possible to generate two distinct pressures: a regulated pressure intended for pressurizing the endothelial chamber via a switching element 432 (such as a valve), and an operating pressure intended for controlling the fluid switching elements 26 via the connections 22.

The use of a pressurized gas injection device 43 (instead of the roller pump described in WO 2014/140434) separate from the cartridge 2 has many advantages.

In particular, it makes it possible to:
reduce the size and weight of the cartridge 2 integrating the preservation chambers,
increase the service life of the cartridge 2 (by avoiding of the hose wear problem linked to the use of a peristaltic pump),
reduce the heat generated by the pump (the motor of a peristaltic pump emits more calories than a compressed gas injection device),
reduce "jerks" in the regulation of preserving fluid flow and pressure,
regulate more precisely the pressure and flow rate in the chamber(s),
improve the energy efficiency of pressurization-circulation,
facilitate the realization of an independent fluidic circuit in the epithelial chamber, in order to expose it to a preserving fluid different from the endothelial chamber,
facilitate intermittent exposure of the corneal specimen 3 to a gas flow (such as air or an atmosphere controlled by oxygen and/or carbon dioxide enrichment) to improve the quality of the corneal tissue and/or facilitate its imaging (possibility of filling the epithelial chamber with gas (for example air) which allows the use of instruments for optical measurement of the graft (pachymetry or detection of optical aberrations due to refractive surgery of the donor, as an example by optical coherence tomography, or specular microscopy),
limit the risk of contamination by the external environment,
facilitate the transport of the device (from the sampling site to the corneal bank and from the bank to the operating theatre) by integrating all the elements necessary for the preservation of corneal tissue in the device.

Pressurized gas is used to propel the preserving fluid 41 into the preservation chambers.

2.2.1. "with Contact" Type Fluid Supply

Figure 6:
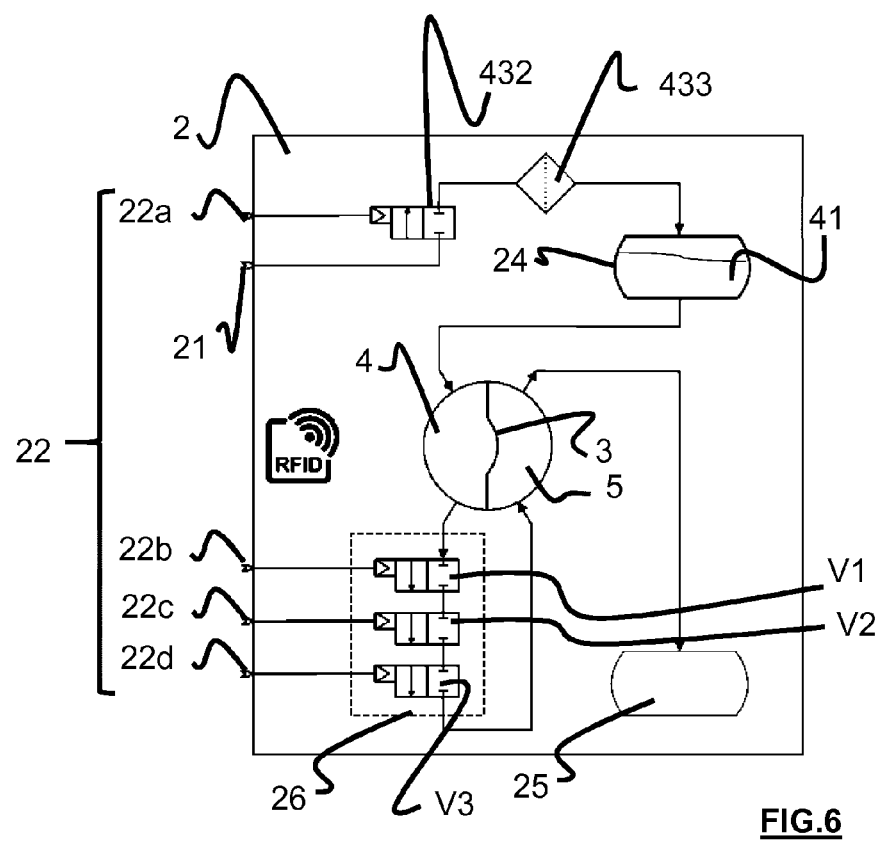

FIG. 6 shows an embodiment in which the preserving fluid 41 is stored directly in the storage compartment 24 for a "contact type" fluid supply.

In this case the compressed gas from the injection device is introduced directly into the compartment 24 to propel the preserving fluid 41 to the endothelial chamber 4 (gas and fluid mix in this configuration). The advantage of this solution is that it allows exchanges between the gas and the preserving fluid (for example enrichment with dioxygen and/or carbon dioxide).

In the embodiment illustrated in FIG. 6, the cartridge 2 comprises a switching element 432 and a filter 433 between the input terminals 21 and the control terminals 22 on the one hand, and the storage compartment 24 on the other hand.

In this embodiment, the operating principle is as follows. The injection device 43 provides:
a compressed pressurizing gas regulated in pressure via the inlet terminal 21, this pressurizing gas being intended to be injected into the storage compartment 24, and
a compressed control gas via the control terminal 22, which is used to control the opening and closing of the switching element 432, The switching element 432 controls the injection of the pressurizing gas into the storage compartment 24. Specifically, a compressed control gas (forming a pneumatic control) is applied to the control terminal 22a to allow the pressurized pressurizing gas injected via the inlet terminal 21 to propagate to the storage compartment 24.

The filter 433 sterilizes the compressed pressurizing gas from the injection device 43 prior to its introduction into the compartment 24. The pressurizing gas injected into the storage compartment pushes the preserving fluid 41 to the endothelial chamber 4. The medium initially contained in the endothelial chamber 4 (for example air when the device is closed), is expelled towards the epithelial chamber 5.

2.2.2. Non-Contact Type Fluid Supply

Figure 7:
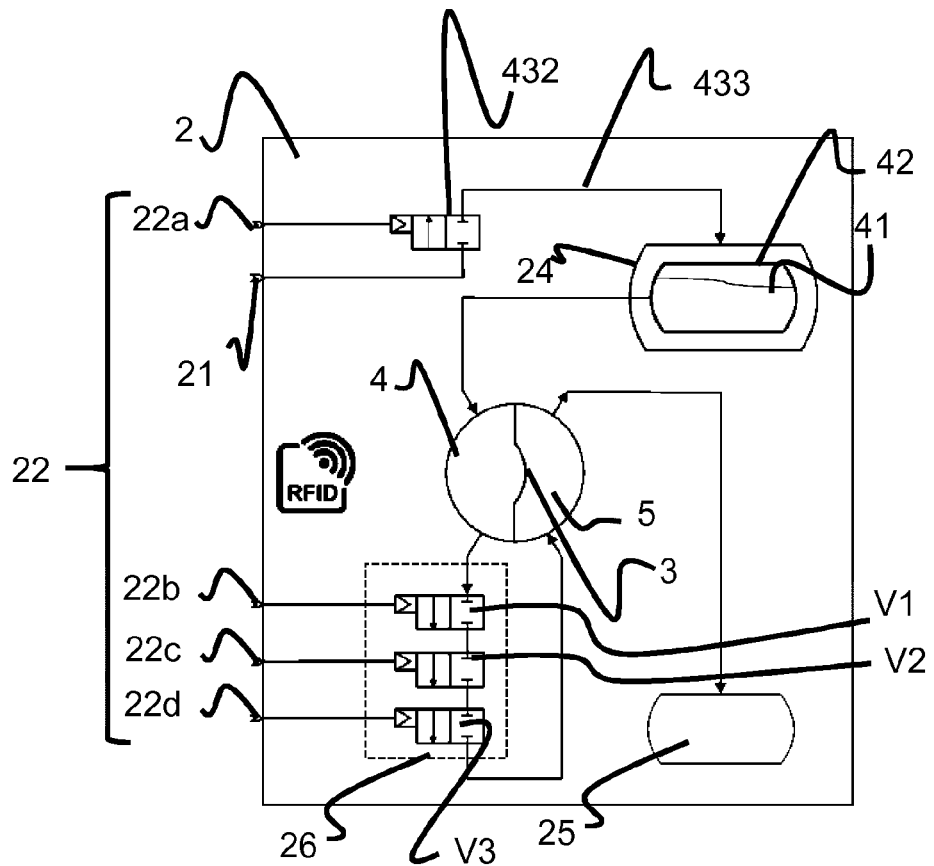

With reference to FIG. 7, an embodiment has been illustrated in which the preserving fluid 41 is contained in a container 42 housed in the storage compartment 24 for a "non-contact" type fluid supply. The container 42 may consist of a medical pouch comprising two flexible or soft sheets superimposed and welded at their periphery.

An inflatable ball to receive the pressurizing gas is also housed in the storage compartment 24. This inflatable ball allows pressure to be exerted on the outer faces of the walls of the container 42 when it expands to propel the preserving fluid 41 to the endothelial chamber 4 (gas and fluid do not mix in this configuration).

In the embodiment illustrated in FIG. 7, the cartridge 2 has a switching element 432 between the terminals 21,22 and the storage compartment 24.

In this embodiment, the operating principle is as follows. The injection device 43 supplies the compressed gases (pressurization and control) to the input and control terminals 22.

The switching element 432—controlled by the pressure sensor—controls the injection of the pressurizing gas into the storage compartment 24. Specifically, a control compressed gas (forming a pneumatic control) is applied to the control terminal 22a to allow the pressurized pressurizing gas injected via the inlet terminal 21 to propagate to the storage compartment 24.

The compressed pressurizing gas is introduced into the inflatable ball, which tends to press against the walls of container 42 as it expands.

This pressure exerted by the inflatable ball on the container 42 induces the ejection of preserving fluid 41 to the endothelial chamber 4.

2.2.3. Switching System

The injection device 43 also supplies control compressed gas to the switching system 26 via the control terminals 22b, 22c, 22d. This control gas is used to control the switching system 26.

Figure 8:
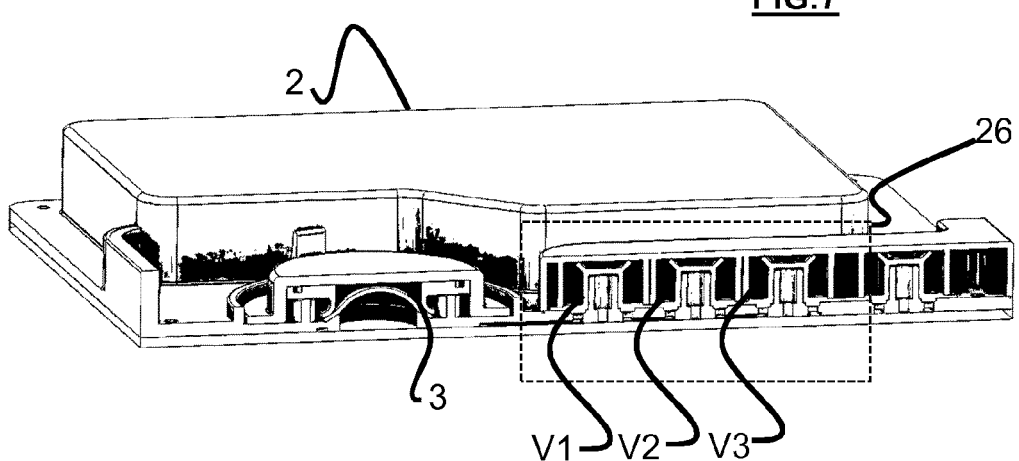
FIG. 8 is a schematic representation of a cross-sectional view of a cartridge showing a switching system.

FIG. 8 shows an example of a switching system 26 to control the flow and pressure of the preserving fluid within the endothelial chamber 4 and epithelial chamber 5.

The switching system 26 consists of valves V1, V2, V3 that are pneumatically operated (by means of control gas injected into the control terminals 22b, 22c, 22d).

These valves V1, V2, V3 can consist of elastomer valves which are deformable under the effect of pneumatic pressure. These valves V1, V2, V3 have the particularity of being closed in the absence of pilot pressure. This allows the cartridge 2 to remain under pressure when it is removed from its rack 7.

The valves V1, V2, V3 are operated in a sequence performed in five steps.

In a first (so-called initial) step, the three valves V1, V2, V3 are closed at rest and no liquid can flow through the switching system 26.

In a second step, the injection device 43 emits a control gas into the control terminals 22b, 22C. The first and second valves V1, V2 open under the action of the control gas. This allows the preservation medium to enter the second valve V2 via the first valve V1.

In a third step, the injection device 43 stops the emission of control gas in the control terminal 22b. The first valve V1 closes, thus trapping a quantity of preserving fluid in the dead volume of the second valve V2.

In a fourth step, the injection device 43 emits a control gas into the control terminal 22d. The third valve V3 opens to release the fluid contained in the second valve V2.

In a fifth step, the injection device 43 stops the emission of control gas in the control terminal 22c. The second valve V2 closes by expelling the fluid contained in its dead volume to the third valve V3.

The return to the initial step results in the closing of the third valve V3 which in turn expels the fluid contained in its dead volume towards the epithelial chamber 5.

A complete cycle displaces a volume of fluid equivalent to the dead volume of one valve, and in particular the dead volume of the second valve V2. It is therefore the dead volume of the second valve V2, and the repetition frequency of the sequence that will determine the flow of fluid in the cartridge 2.

CONCLUSIONS

The invention described above improves the operation of the bioreactor according to WO 2014/140434, the quality of corneal tissue as well as its imaging, and extends its applications to new functions, such as corneal cutting in a closed vessel by laser, corneal trepanation etc.

a. The device described above increases the storage life of corneal tissue. It also improves the quality of the corneal tissue stored.

In particular, the arrangement of the locking means, and in particular the translational movement of the retaining ring 142 in relation to the base 141, prevents the corneal tissue 3 from twisting and thus the appearance of folds in it.

In addition, the presence of clipping means 111 for the assembly of the side wall 12 on the base 11 ensures that a constant compressive force is applied to the corneal tissue. This makes the corneal tissue placement operation repeatable from one medical device to another.

b. The device described above also improves the imaging quality of the corneal tissue 3.

In particular, the fact that the applanation lid 13 includes means for translational movement of the window 131 limits the risk of the corneal tissue 3 twisting during flattening, as this twisting can degrade the imaging quality of the corneal tissue 3.

c. Finally, the device described above makes it easier to manipulate the corneal tissue 3, especially with regard to its removal from the device, for example during corneal graft surgery.

In reference to the extraction of the corneal tissue 3, the presence of a zone of weakness on the elastic tabs makes them breakable under the action of a force of intensity greater than a rupture threshold of the zone of weakness. This facilitates the disassembly of the side wall 12 in order to free the corneal tissue 3 during a graft surgery procedure.

The reader will have understood that many changes can be made to the medical device described above without materially altering the new teachings and benefits described here. Therefore, all such changes are intended to be incorporated within the scope of the attached claims.

The invention claimed is:

1. A medical device in the form of a cartridge incorporating an assembly allowing the preservation of previously removed corneal tissue, the device comprising:
    an at least partially transparent base,
    at least one side wall,
    a receiver for receiving and locking corneal tissue, and
    a transparent lid for covering an opening in the side wall opposite the base,
    a storage compartment containing a preserving fluid,
    at least one inlet terminal upstream of the storage compartment, said inlet terminal being intended to be connected to a device for injecting compressed pressurizing gas, the pressurizing gas allowing:
        to eject the preserving fluid contained in the storage compartment to preservation chambers,
        to maintain the preserving fluid at a predefined pressure,
    the device being configured such that, in use, the base, the side wall, and the lid define corneal tissue endothelial and epithelial preservation chambers,
    wherein the device further comprises, upstream of the preservation chambers:
        at least one control terminal upstream of the storage compartment, said control terminal being intended to be connected to a control compressed gas injection device,
        a pneumatically piloted switching system downstream of the terminals, said switching system being piloted by the control compressed gas to allow or prohibit the flow of the pressurizing compressed gas to the storage compartment.

2. The device as claimed in claim 1, which further comprises a filter upstream of the storage compartment for filtering the pressurized compressed gas injected at the inlet terminal.

3. The device as claimed in claim 2, wherein the preserving fluid is contained directly in the storage compartment, wherein the filtered pressurizing compressed gas injected at the inlet terminal is introduced directly into the storage compartment and mixed with the preserving fluid.

4. The device as claimed in claim 1, which further comprises an inflatable ball housed in the storage compartment, the preserving fluid being contained in a flexible container housed in the storage compartment, the injection of pressurizing compressed gas inducing an expansion of the inflatable ball so that the walls of said ball presses against the walls of the flexible container and causes the ejection of the preserving fluid towards the preservation chambers.

5. The device as claimed in claim 1, which further comprises channels for the circulation of preserving fluid and channels for the circulation of compressed gas, said channels being etched in the mass.

6. The device as claimed in claim 1, which further comprises a recovery reservoir downstream of the preservation chambers, the switching system being arranged upstream of the recovery reservoir and being capable of controlling the flow rate of the holding fluid within the preservation chambers.

7. The device as claimed in claim 6, wherein the switching system comprises at least one valve controlled by pneumatic pressure by a controller for controlling compressed gas injected into the at least one control terminal, each valve being closed in the absence of control compressed gas applied to the at least one control terminal.

8. The device as claimed in claim 1, which further comprises an inflation balloon, wherein manual actuation of the inflation balloon increases the pressure in the storage compartment and thus in the preservation chambers.

9. The device as claimed in claim 1, wherein the input and control terminals are arranged on the device so as to be automatically connected to a linker connected to the injection device upon insertion of said device into a docking station.

10. The device as claimed in claim 9, which further comprises guide at its periphery for plugging said device into a rack of a docking station support structure.

* * * * *